Oct. 18, 1955 E. K. STODOLA 2,721,266

OSCILLOSCOPE SWEEP CIRCUIT

Filed Nov. 6, 1950

INVENTOR.
EDWIN K. STODOLA

BY Harry M. Saragovitz
Attorney

United States Patent Office 2,721,266

Patented Oct. 18, 1955

2,721,266

OSCILLOSCOPE SWEEP CIRCUIT

Edwin King Stodola, Neptune, N. J., assignor to the United States of America as represented by the Secretary of the Army Application November 6, 1950, Serial No. 194,303

11 Claims. (Cl. 250—36)

(Granted under Title 35, U. S. Code (1952), sec. 266)

The invention described herein may be manufactured and used by or for the Government for governmental purposes, without the payment to me of any royalty thereon.

This invention relates generally to cathode ray tube oscillographs and more particularly to means for providing push-pull time base deflection voltages having linear portions of different slopes.

A linear time base deflection voltage is required for most applications in which cathode ray tube oscilloscopes are used. It is also required in some applications that means be provided for expanding a portion of the presentation on the oscilloscope screen. While systems for accomplishing this objective have heretofore been devised, it is an object of this invention to provide an alternative, novel and relatively simple circuit for accomplishing this objective.

It is still another object to provide an improved sawtooth wave-generating circuit having a voltage-controlled time constant network which is energized by the output of said generator.

It is another object to provide an improved circuit producing a balanced output of push-pull sweep voltages.

It is still another object to provide an improved circuit which is D. C. coupled to permit operation over a wide range of frequencies without distortion.

It is a still further object to provide such a circuit having low impedance outputs.

It is a still further object to provide an improved circuit for obtaining a blanking pulse.

According to the invention there is provided a sweep generating circuit including a pentode sawtooth wave generator and means for varying the slope of a portion of the sawtooth wave comprising a diode connected between the source of positive potential and the control grid of said pentode and having means for changing the conduction of said diode at a predetermined voltage point on the sawtooth wave, The invention together with further objects and advantages will be better understood from the following description of the invention taken in connection with the accompanying drawings in which.

Figure 1:
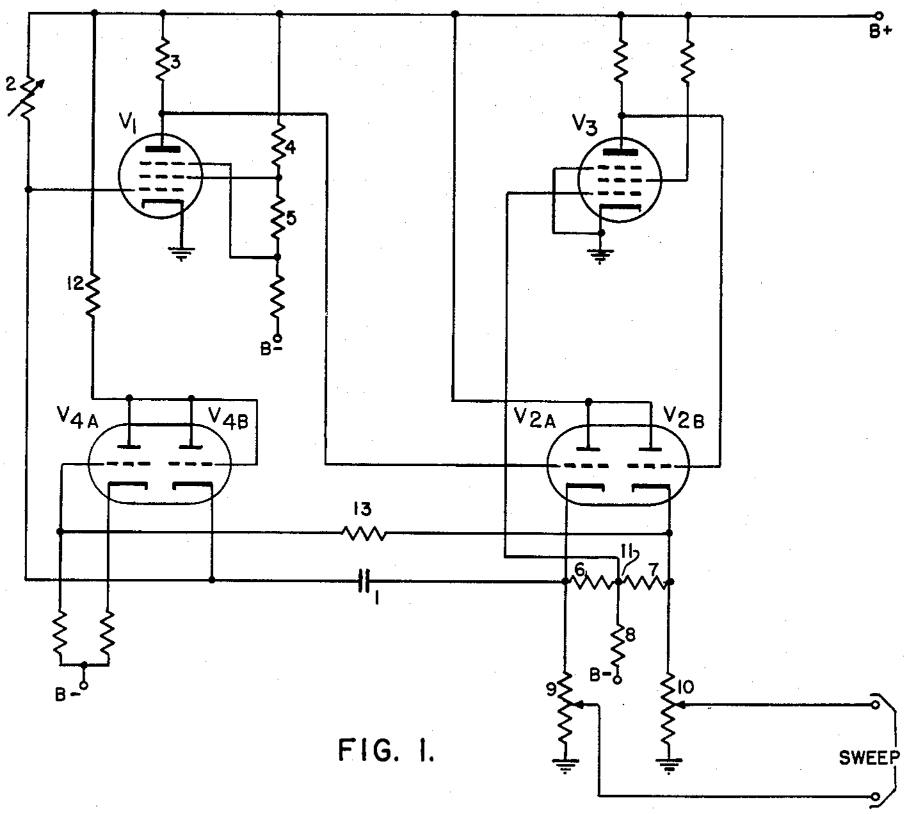
Fig. 1 is a circuit diagram of a preferred embodiment of the invention.

Referring now to Fig. 1, the circuit can be considered to consist of essentially three components, a sawtooth voltage generator, a self-balancing inverter and a sweep expander.

Tubes V1 and the "A" half of tube V2 together with the associated circuits make up the sawtooth wave generator. Tube V1 is a pentode. Its plate is connected back to the grid through cathode follower V2A and condenser 1. This inverse feedback maintains the linearity of the slope of the sawtooth wave due to the so-called Miller action. The slope or timing of the sawtooth wave at the plate is basically determined by the discharging of condenser 1 through variable resistor 2. Self-oscillation is maintained by the feedback from suppressor grid to screen grid through the unbypassed resistors 4, 5. These resistors comprise part of a voltage divider network between B+ and B—.

Tubes V2A and V2B (also connected as a cathode follower) in cooperation with inverter amplifier V3 comprise a self-balancing circuit which provides low impedance push-pull outputs. The grid of tube V3 is D. C. coupled to a point 11 on the resistance bridge between the cathodes of tubes V2A and V2B. This point is also connected to a source of negative potential through resistor 8. The plate of V3 is D. C. coupled to the grid of V2B. The push-pull outputs are tapped off from cathode potentiometers 9, 10.

The expander circuit consists of tubes V4A and V4B. Tube V4B is connected as a diode. Its plate is in parallel with the plate of V4A. Resistor 12 is therefore a plate load for both tubes. The cathode of triode V4B is directly connected to the control grid of tube V1. The cathode of V4A is returned to a point of negative potential and its grid is D. C. coupled to the cathode of tube V2B through an isolating resistor 13.

Consider now the operation of the circuit. Taking first the sawtooth generator which, as mentioned, is a phantastron of the astable type. Assume a point on the cycle in which the suppressor grid of tube V1 goes positive permitting electrons to reach the plate. The plate will then tend to drop rapidly in potential. This drop is prevented by the inverse feedback to the grid through condenser 1 which tends to cut off the flow of electrons to the plate. It can be seen that the circuit will stabilize itself with the control grid at some negative potential permitting the plate potential to fall as condenser 1 discharges through resistor 2. This will continue until the plate potential is at some low value (about 5 volts) and condenser 1 has been discharged. The control grid will then go slightly positive with respect to the cathode due to the fact that it is connected to B+ through resistor 2, thereby permitting more electrons to go towards the screen grid and plate. However, the screen grid will receive most of the electrons due to the comparatively low plate potential. The result will be a large voltage drop in the screen potential due to current through resistor 4. This drop in potential is also coupled to the suppressor grid through resistor 5 thereby preventing electrons from reaching the plate. The plate potential will now tend to rise. It, however, cannot rise faster than the charging of condenser 1. Tube V2A provides a low impedance source for charging condenser 1. The cycle is repeated when capacitor 1 is fully charged which reduces the cathode (and therefore the screen) current causing the screen to rise in potential and, likewise, the suppressor grid due to the coupling through resistor 5. The reduction in screen current may also be aided by the higher potential reached by the plate. As a result, the plate will draw more electrons causing a further rise in the suppressor grid potential. The cycle will then repeat.

To provide equal push-pull voltages having equal impedance outputs it is necessary that an inverted version of the sawtooth voltage at the plate of tube V1 be fed into a cathode follower.

In this embodiment, this is accomplished by connecting the grid of a conventional inverter amplifier V3 to the junction 11 of resistors 6 and 7 which forms part of the balancing bridge including triodes V2A and V2B.

It will be seen, assuming that resistor 8 were not connected to B—, that, as the cathode of tube V2A goes down, the potential of the mid-point 11 will also go down causing the plate of inverter tube 3 to rise and consequently the cathode of tube 2B to rise also. It is evident that a position of balance will be reached in which the potential at the midpoint is approximately $e/A$ in which $e$ is the sawtooth voltage from the plate of V1 and A is the amplification of the inverter stage. The average potential at midpoint 11 is maintained at the correct negative potential to bias the grid of tube V3 by connecting the midpoint 11 to B— through resistor 8.

The expander circuit comprises the dual triode V4 in which the B section is connected as a diode. At the start of the sawtooth the B section, together with its plate resistor 12, is in parallel with resistor 2 thereby reducing the discharge time of condenser 1 and allowing a relatively fast run down of the plate of V1. The inverted voltage from the cathode of triode V2B is connected to the grid of triode V4A. When the grid rises to a predetermined value it will cause V4A to conduct. The current through the common load resistor 12 will cause the plate of V4B to become negative with respect to its cathode thereby cutting off the conduction. The discharge of condenser 1 will now be regulated by only resistor 2 reducing the run down rate of the plate of V1.

Figure 2:
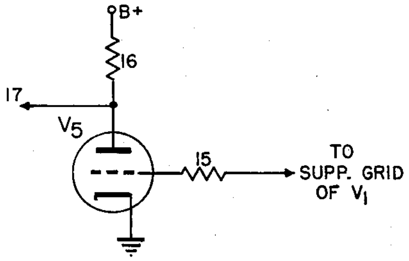
Fig. 2 shows a circuit for obtaining a blanking pulse.

An additional feature shown in Fig. 2 is a method for producing a blanking or auxiliary triggering pulse during the return sweep interval. The components for producing this pulse include triode V5 and resistors 15 and 16. The grid of triode V5 is connected to suppressor of V1 through a high resistance 15. The suppressor of V1 is slightly positive during all of the sweep cycle except during the recharging of capacitor 1, when it is negative. During the positive period, the grid cathode space of V5 has a low impedance compared to that of resistor 15, hence, despite variations in the positive region at the suppressor of V1, the grid of V5 remains relatively fixed at a slightly positive potential. This corresponds to a large plate current through triode 5 and resistor 16, so that the plate of V5 is at a relatively low potential. However, when the suppressor goes negative during the return sweep or charging of condenser 1 the grid cathode space of V5 ceases to conduct and has a much higher impedance than previously so that the full negative impulse from the suppressor of V1 is applied to the grid of V5 and its plate current is therefore greatly reduced. This produces a sharp rise in the plate voltage of V5 which is available at point 17 for use in a blanking, triggering or other circuit.

While there has been shown a preferred embodiment of the invention, it will be obvious to those skilled in the art that various changes and modifications may be made without departing from the spirit and scope of the invention.

What is claimed is:

1. A sweep voltage generator comprising a self-oscillatory sawtooth voltage wave generator of the phantastron type, means for varying the slope of a portion of said sawtooth wave when said sawtooth wave reaches a predetermined level, and means for producing low impedance push-pull output voltages comprising first and second cathode followers, a resistance bridge between the cathodes of said cathode follower, and an inverter amplifier, the grid of said first cathode follower being direct coupled to the plate of said sawtooth voltage wave generator, the grid of said inverter being direct coupled to the midpoint of said resistance bridge, the plate of said inverter being direct coupled to the grid of said second cathode follower, and the midpoint of said resistance bridge being direct coupled to a source of negative potential.

2. The device according to claim 1 wherein said means for varying the slope of said sawtooth wave comprises a diode and triode having a common plate resistor, the cathode of said diode being connected to the control grid of said generator, the cathode of said triode being connected to a source of negative potential, and the control grid of said triode being direct connected to the cathode of said second cathode follower.

3. A wave-generating device comprising circuit means for producing a saw-tooth wave of voltage which varies between predetermined limits, said circuit means including a time-constant network which controls the slope of the saw-tooth wave; and means coupled to said network and energized by said saw-tooth wave for changing the time constant of said network from a first value to a second value in response to said saw-tooth wave passing through a potential intermediate said limits, whereby one portion of one edge of each cycle of said saw-tooth wave has a slope which is different from that of another portion.

4. The wave-generating device of claim 3, wherein said time constant network comprises a first resistor and a reactance connected thereto, and coupled to said circuit, and wherein said slope changing means includes a second resistor, control means effective to couple and decouple said second resistor to said time constant network, and means coupled to said control means and energized by said sawtooth wave for operating said control means when said saw-tooth wave reaches said intermediate potential.

5. The wave-generating device of claim 4, wherein said control means includes a diode and a triode, the anode of said triode being coupled to the anode of said diode, both being coupled to said resistor, the cathode of said diode being coupled to said circuit, the grid of said triode being biased to cut-off, and means to apply said wave to said grid to trigger said triode at said intermediate potential.

6. A device for producing a blanking pulse comprising: a saw-tooth wave generator including a first electron device having at least an anode, a cathode, a control grid, and at least one more grid; a source of operating potential for said device; a voltage divider connected across said source; said one grid being coupled to said voltage divider; a second electron device having at least a plate, a grid, and a cathode, said cathode of said second electron device being connected to a point of reference potential, a first impedance coupling said plate to a potential which is positive with respect to said point of reference potential, a second impedance coupling the grid of said second electron device to said voltage divider; the grid-cathode space of said second electron device having a low impedance compared to that of said second impedance during the sweep portion of the saw-tooth wave produced by said generator, and a high impedance during the return sweep of said saw-tooth wave.

7. A device for producing a blanking pulse comprising: a saw-tooth wave generator including a first electron device having at least an anode, a cathode, a control grid, a screen grid and a suppressor grid; a source of operating potential for said first electron device; a voltage divider connected across said source; said screen grid being coupled to said voltage divider, said suppressor grid being coupled to a lower potential point on said voltage divider than said screen grid; a second electron device having at least a plate, a grid, and a cathode, said cathode of said second electron device being connected to a point of reference potential, a first impedance coupling said plate to a potential which is positive with respect to said point of reference potential, a second impedance coupling the grid of said second electron device to said suppressor grid; the grid-cathode space of said second electron device having a low impedance compared to that of said second impedance during the sweep portion of the saw-tooth wave produced by said generator, and a high impedance during the return sweep of said saw-tooth wave.

8. The wave-generating device of claim 5, wherein said reactance is a capacitor and is serially connected to said first resistor.

9. A wave generating device comprising means for producing a saw-tooth wave, said means comprising a time-constant network which controls the slope of said wave, voltage-controlled means for changing the time-constant of said network, and means for applying said saw-tooth wave to said voltage-controlled means for changing the time constant of said network during a portion of each cycle of said wave thereby to change the slope of said wave during said portion.

10. A wave generating device as set forth in claim 3, wherein said time-constant network comprises an electron discharge device, and wherein said means controls the conductance of said electron discharge device.

11. A wave generating device as set forth in claim 10, wherein said electron discharge device is normally conducting and wherein said means reduces the conductivity of said electron discharge device.

References Cited in the file of this patent

UNITED STATES PATENTS

| | | |
|---|---|---|
| 2,265,290 | Knick | Dec. 9, 1941 |
| 2,448,069 | Ames | Aug. 31, 1948 |
| 2,448,070 | Sunstein | Aug. 31, 1948 |
| 2,584,882 | Johnson | Feb. 5, 1952 |

OTHER REFERENCES

Chance et al.: text on "Waveforms," Radiation Laboratory series, 1st. edition, 1949, pages 197–200, 287 and 288.